US011063886B2

(12) United States Patent
Shani et al.

(10) Patent No.: US 11,063,886 B2
(45) Date of Patent: Jul. 13, 2021

(54) SYSTEM AND METHOD FOR DIRECTING DATA PACKETS BY A VIRTUAL SWITCH OVER A UNIDIRECTIONAL MEDIUM

(71) Applicant: VADO SECURITY TECHNOLOGIES LTD, Tel Aviv (IL)

(72) Inventors: Oren Shani, Givataaim (IL); Tamir Levinas, Tel Aviv (IL); Yossi Ben Hagay, Petach Tikva (IL)

(73) Assignee: VADO SECURITY TECHNOLOGIES LTD, Tel Aviv (IL)

( * ) Notice: Subject to any disclaimer, the term of this patent is extended or adjusted under 35 U.S.C. 154(b) by 0 days.

(21) Appl. No.: 16/466,776

(22) PCT Filed: Jul. 12, 2017

(86) PCT No.: PCT/IL2017/051328
§ 371 (c)(1),
(2) Date: Jun. 5, 2019

(87) PCT Pub. No.: WO2018/104947
PCT Pub. Date: Jun. 14, 2018

(65) Prior Publication Data
US 2019/0342233 A1    Nov. 7, 2019

Related U.S. Application Data

(60) Provisional application No. 62/431,601, filed on Dec. 8, 2016.

(51) Int. Cl.
*H04L 12/46* (2006.01)
*H04L 12/713* (2013.01)
(Continued)

(52) U.S. Cl.
CPC .......... *H04L 49/70* (2013.01); *H04L 12/4625* (2013.01); *H04L 12/4641* (2013.01);
(Continued)

(58) Field of Classification Search
CPC ...... H04L 69/24; H04L 69/324; H04L 69/326
See application file for complete search history.

(56) References Cited

U.S. PATENT DOCUMENTS 9,621,373 B2 * 4/2017 Hwang ............... G06F 9/45558
2002/0094799 A1 * 7/2002 Elliott .................... G01D 4/002
455/405

(Continued)

FOREIGN PATENT DOCUMENTS

KR     20080065325 A     7/2008

*Primary Examiner* — Raj Jain
(74) *Attorney, Agent, or Firm* — Browdy and Neimark, P.L.L.C.

(57) ABSTRACT

Methods and systems are provided for directing data packets over a network from a source machine (100) via at least one virtual packet switch (110, 130), over a physical unidirectional connection (150, 250) to at least one destination machine (200), by configuring a transmission (TX) Layer 3 agent module (140), located between the source machine and the physical unidirectional connection, to receive an Address Request Protocol (ARP) request message from the source machine and to respond with an ARP response message containing a Media Access Control (MAC) address of a reception (RX) machine, wherein the physical unidirectional connection is located on the network between the TX Layer 3 agent module and the RX machine.

7 Claims, 4 Drawing Sheets

(51) Int. Cl.
*H04L 1/00* (2006.01)
*H04L 29/12* (2006.01)
*H04L 12/741* (2013.01)
*H04L 12/931* (2013.01)
*H04L 29/08* (2006.01)

(52) U.S. Cl.
CPC ............ *H04L 45/586* (2013.01); *H04L 45/74* (2013.01); *H04L 69/324* (2013.01); *H04L 69/326* (2013.01); *H04L 1/004* (2013.01); *H04L 61/103* (2013.01)

(56) References Cited

U.S. PATENT DOCUMENTS

| | | |
|---|---|---|
| 2006/0209719 A1 | 9/2006 | Previdi et al. |
| 2010/0299742 A1* | 11/2010 | Declety ............... H04L 63/0209 726/13 |
| 2010/0325257 A1* | 12/2010 | Goel .................... H04L 61/103 709/223 |
| 2011/0299537 A1* | 12/2011 | Saraiya ................ H04L 69/324 370/392 |
| 2012/0158997 A1* | 6/2012 | Hsu ......................... H04L 45/66 709/242 |
| 2013/0136131 A1 | 5/2013 | Hirai |
| 2015/0188985 A1* | 7/2015 | Marty ................ H04L 63/0227 709/218 |
| 2015/0215075 A1* | 7/2015 | Baek ...................... H04L 63/18 726/4 |
| 2015/0326475 A1 | 11/2015 | Cj |
| 2019/0342233 A1* | 11/2019 | Shani ................ H04L 12/4625 |

* cited by examiner

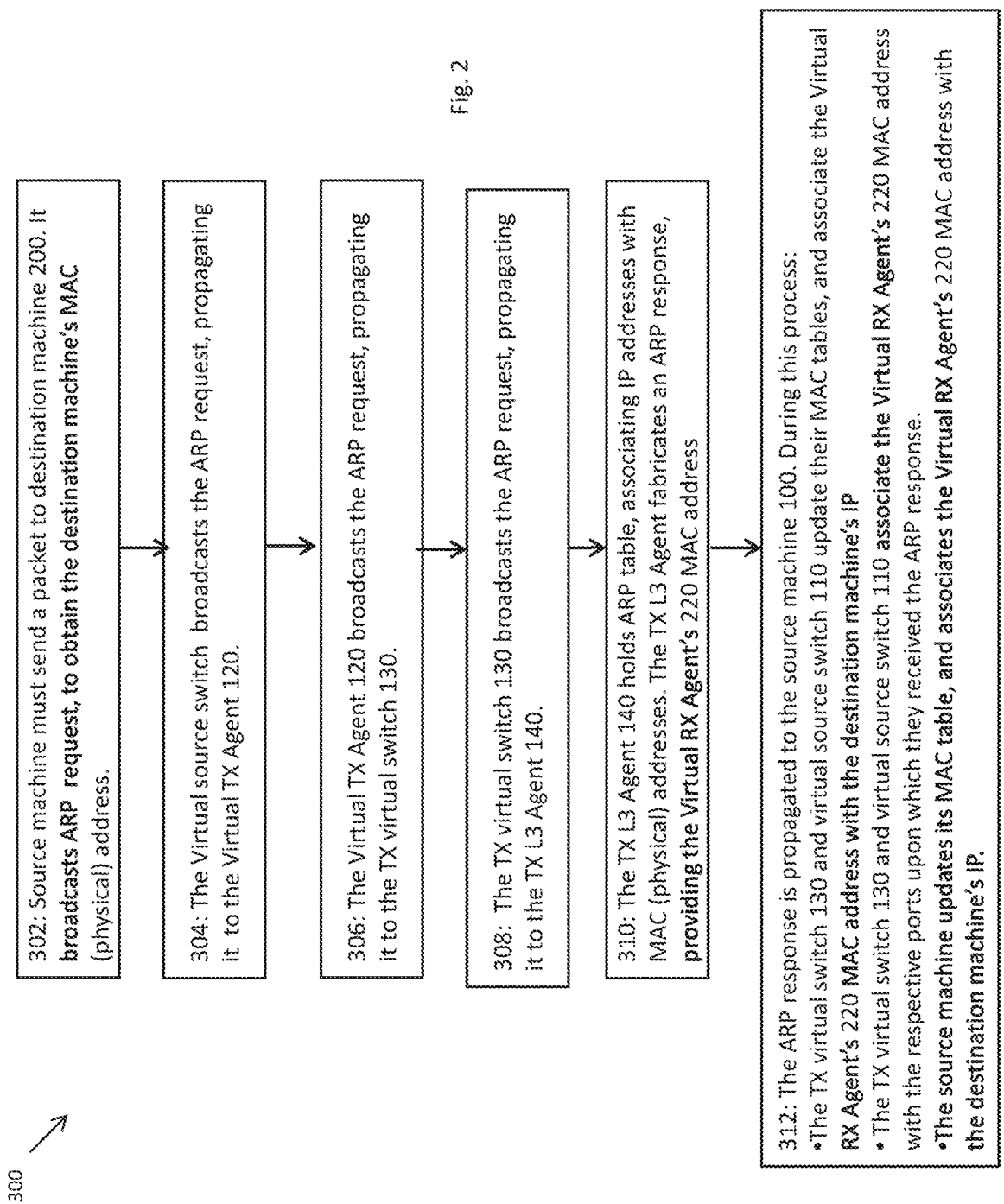

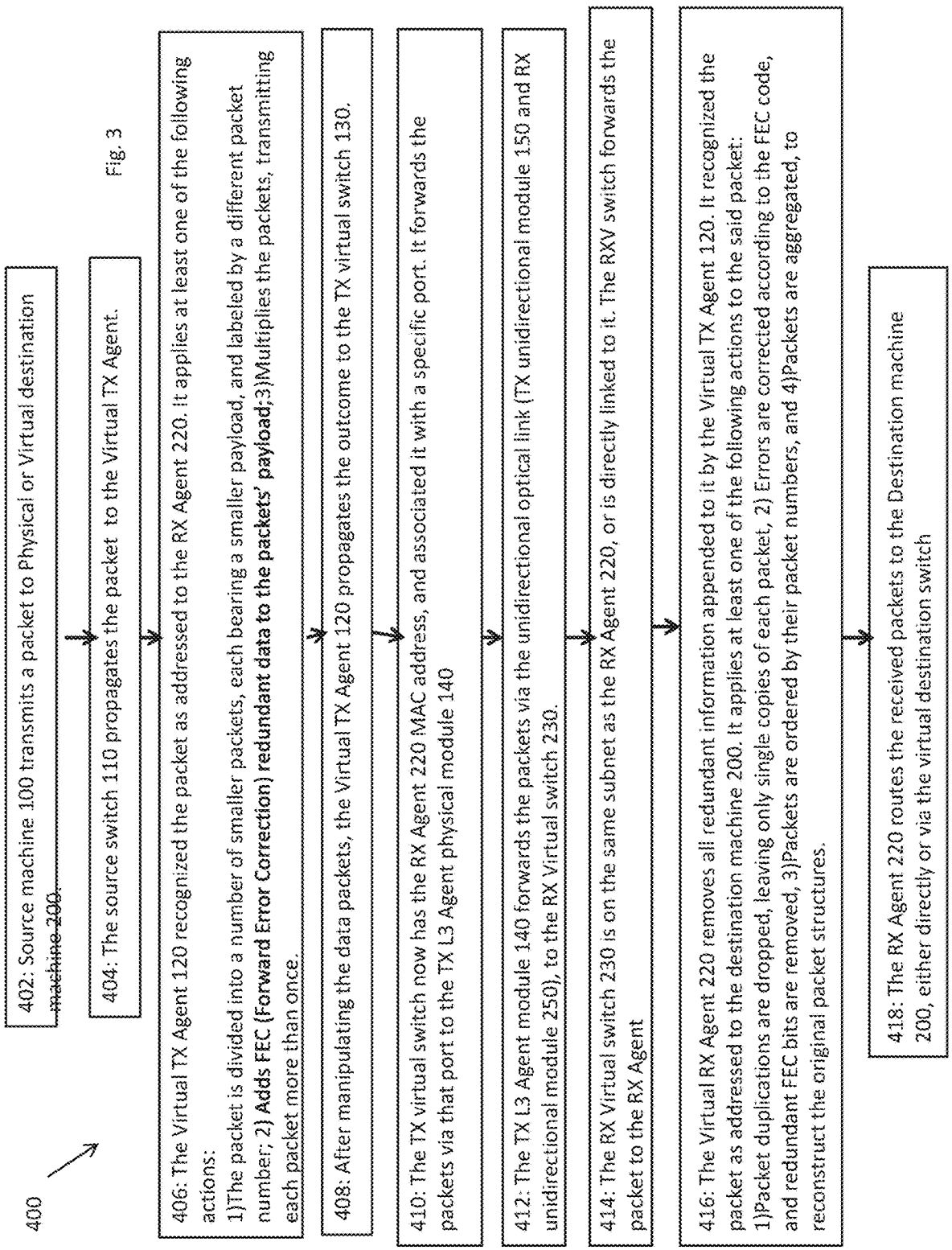

SYSTEM AND METHOD FOR DIRECTING DATA PACKETS BY A VIRTUAL SWITCH OVER A UNIDIRECTIONAL MEDIUM

FIELD OF THE INVENTION

The presented invention relates to the field of computer networks, specifically to communication over unidirectional medium.

DISCUSSION OF RELATED ART

The use of unidirectional network elements is commonplace in modern network security disciplines. They are often located in the junction points between networks of different security levels. Such devices enable the transfer of data in one direction only, as their name implies, and therefore provide inherent security, as data is simply unreachable from beyond the protected network.

The introduction of unidirectional network elements does however take a toll on the network's flexibility. Creative solutions are required in order to maintain the network's plasticity and the streamlined connectivity among its member nodes.

SUMMARY

Embodiments of the present invention provide a system for directing data packets over a network from a source machine (100) via at least one virtual packet switch (110, 130), over a physical unidirectional connection (150, 250) to at least one destination machine (200), by configuring a transmission (TX) Layer 3 agent module (140), located between the source machine and the physical unidirectional connection, to receive an Address Request Protocol (ARP) request message from the source machine and to respond with an ARP response message containing a Media Access Control (MAC) address of a reception (RX) machine, wherein the physical unidirectional connection is located on the network between the TX Layer 3 agent module and the RX machine.

The system may further comprise: a virtual TX agent module (120), located on the network between the source machine and the TX Layer 3 agent module, configured to identify packets that are addressed to the at least one destination machine, to alter them in a manner facilitating data transmission over unidirectional networks, and to route them towards a virtual RX agent module (220), located on the network between the physical unidirectional connection and the at least one destination machine; and a virtual RX agent module (220) configured to receive said packets from the TX agent module and to route them either directly or via additional network components to the destination machine (200). In some embodiments, the TX Layer 3 agent module (140) is configured to respond to the ARP request message with the MAC address of the virtual RX agent module (220). The virtual TX agent module (120) may be further configured to segment the packets into a number of smaller packets, each bearing a smaller payload and labeled by a different packet number, and wherein the virtual RX agent module (220) is further configured to organize the incoming segment packets by their packet numbers, and to aggregate them to reconstruct the original packet structures. The virtual TX agent module (120) is further configured to add Forward Error Correction (FEC) redundant data to the packets' payloads, and wherein the virtual RX agent module (220) is further configured to correct errors according to the FEC code and remove said redundant FEC bits.

The virtual TX agent module (120) may be further configured to create transmission redundancy, by multiplying the packets and transmitting each packet more than once, and wherein the virtual RX agent module (220) is further configured to drop packet duplications, and leave only single copies of each packet.

The TX Layer 3 agent module (140) may be configured to respond to the ARP request message with the MAC address of the MAC address of the at least one destination machine (200).

There is also provided a method (300) for directing data packets over a network from a source machine (100) via at least one virtual packet switch (110, 130), over a physical unidirectional connection (150, 250) to at least one destination machine (200), said method comprising configuring a transmission (TX) Layer 3 agent module (140), located between the source machine and the physical unidirectional connection, to receive an Address Request Protocol (ARP) request message from the source machine and to respond with an ARP response message containing a Media Access Control (MAC) address of a reception (RX) machine, wherein the physical unidirectional connection is located on the network between the TX Layer 3 agent module and the RX machine.

BRIEF DESCRIPTION OF THE DRAWINGS

FIG. 2 is a flow diagram depicting the process of acquiring a destination machine's Media Access Control (MAC, physical) address in absence of an Address Request Protocol (ARP) response, according to embodiments of the present invention.

FIG. 3 is a flow diagram depicting the propagation of level 3 data, i.e. 'Network' level communications over a unidirectional medium, according to embodiments of the present invention.

DETAILED DESCRIPTION

Figure 1A:
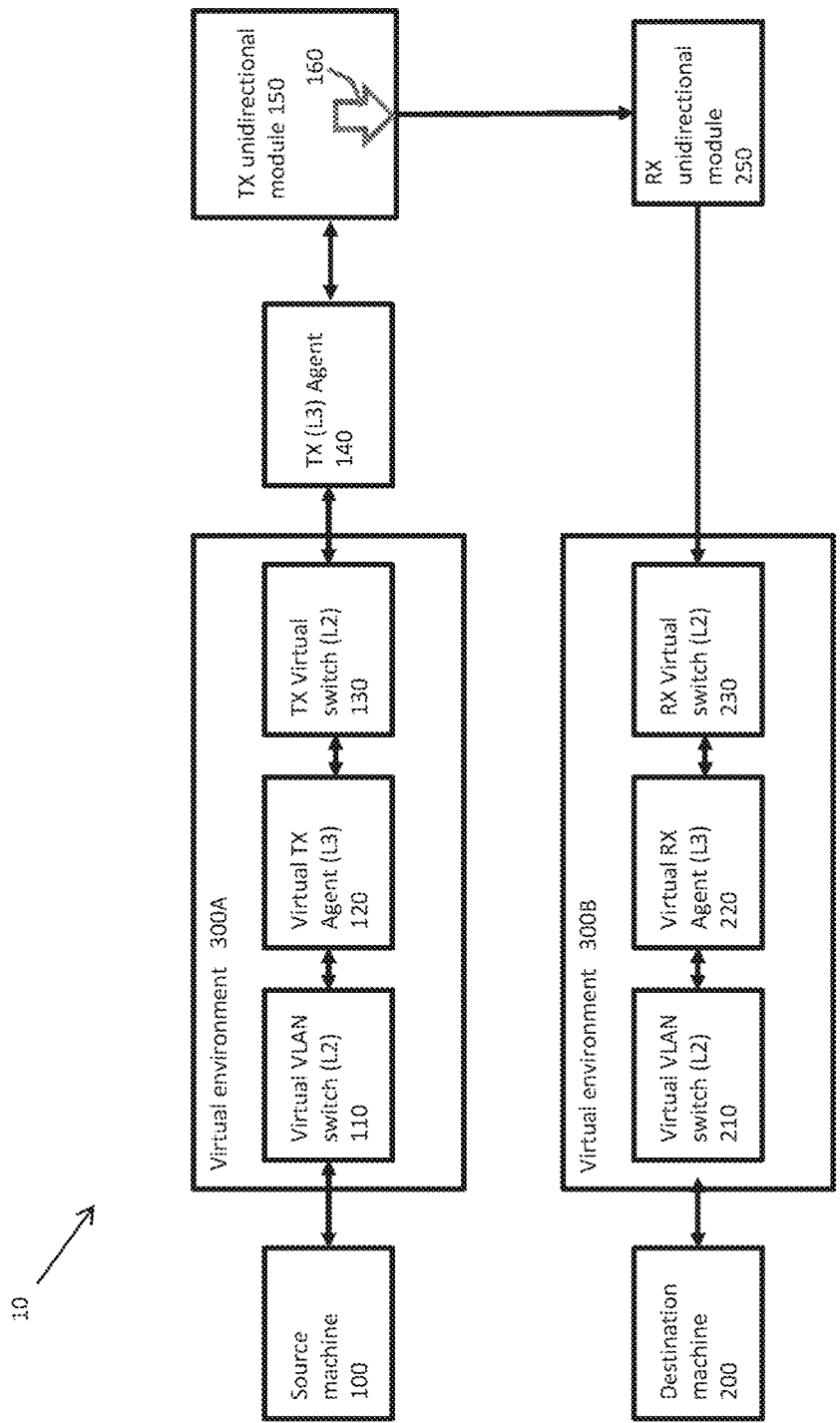
FIGS. 1A and 1B are block diagrams depicting the components of packet switching systems, according to embodiments of the present invention.

It is to be understood that the invention is not limited in its application to the details of construction and the arrangement of the components set forth in the following description or illustrated in the drawings. Terminology employed herein is for the purpose of description and should not be regarded as limiting.

The terms TX and RX are used throughout this document as abbreviations to denote the terms 'Transmission' and 'Reception' respectively. Layer 2 services are provided by devices or modules referred to as "switches". Layer 3 services including Layer 3 packet switching are provided by devices or modules referred to as agents.

FIG. 1A is a block diagram depicting the components of a packet switching system 10, according to embodiments of the present invention. System 10 dynamically switches packets over a unidirectional connection, between a source machine 100 and a destination machine 200, over at least one virtual switch located within at least one of virtual environments 300a and 300b.

In the embodiment depicted in FIG. 1, the unidirectional property of the network is obtained by the connection between a unidirectional TX module 150 and a unidirectional RX module 250, i.e. network frames and packets may only be communicated from the unidirectional TX module 150 to the unidirectional RX module 250, but not vice versa.

A non-limiting example for implementation of the unidirectional connection property is by an optical link, comprising a physical TX diode 160 in the unidirectional TX module 150. The system may also include an RX diode in the unidirectional RX module 250. Additional mechanisms for unidirectional connection implementation may be substituted for the optical link implementation, as known to persons skilled in the art of computer networking.

The source machine 100 is connected either directly or via another network component (e.g. Ethernet switch), typically a local area network (LAN) to the virtual source packet switch 110, which is typically a module within the virtual environment 300*a*.

Inside the virtual environment 300*a*, the virtual source packet switch 110 is connected with a virtual TX agent (L3) 120, and which in turn connects to a virtual TX switch 130.

According to some embodiments, the virtual TX agent 120 bridges between the virtual source switch 110 and the virtual TX switch 130. The virtual source switch 110 and the virtual TX switch 130 are implemented in the same module, and thus a single, 'unified' virtual switch is present with the TX agent module 120 within the virtual environment 300*a*. During normal operation, the TX agent module 120 identifies packets that are addressed to the destination machine 200 alters them in a manner that facilitates data transmission over unidirectional networks, and routes them towards the RX agent module 220. This process is further elaborated below.

The virtual switch 130 is connected to the physical TX agent 140. This agent 140 holds an ARP table, associating IP addresses with MAC (physical) addresses.

The initiation of a network (Layer 3) connection between a source machine 100 and a destination machine 200 depends upon a successful ARP transaction, wherein the source machine 100 sends an ARP request message, asking for the destination machine's MAC address, and the destination machine 200 replies with an ARP response message, containing the answer.

Due to the unidirectional property of the connection between the source machine 100 and the destination machine 200, ARP request messages will arrive at the destination machine 200, but ARP response messages sent from the destination machine 200 will not arrive at the TX side. Consequently, the virtual switches on the TX side will not learn the destination machine's 200 MAC address, and will drop future packets addressed to it.

In order to overcome this difficulty, the physical TX Layer 3 agent 140 is configured to respond to the ARP request messages that are addressed to the destination machine 200, with an ARP response message that contains the MAC address of other modules in the network, according to the ARP table stored therein. This enables the virtual switches on the TX side (110 and/or 130) to propagate packets toward the destination machine 200.

The unidirectional RX module 250 propagates unidirectional data towards the receiving virtual environment 300*b*, where the RX virtual switch 230 receives the data.

Inside the virtual environment 300*b*, the RX virtual switch 230 is communicates with the virtual RX agent module 220, which in turn communicates with the virtual destination switch 210.

According to some embodiments, the RX agent module 220 serves as a router, bridging between the virtual destination switch 210 and the virtual RX switch 230, which may reside on two different networks or sub-networks.

According to some embodiments of the present invention, the virtual destination switch 210 and the virtual RX switch 230 are implemented in the same module, and thus a single, 'unified' virtual switch is present adjacent the RX agent module 220 within the virtual environment 300*b*. According to some embodiments, the RX agent module 220 alters the received data packets in a manner to re-rder packets after the alterations that have been applied to the packets by the TX agent module 120, as explained further below.

The virtual RX agent module 220 routes the received data packets either directly or through the virtual destination switch 210 to the destination machine 200.

Figure 1B:
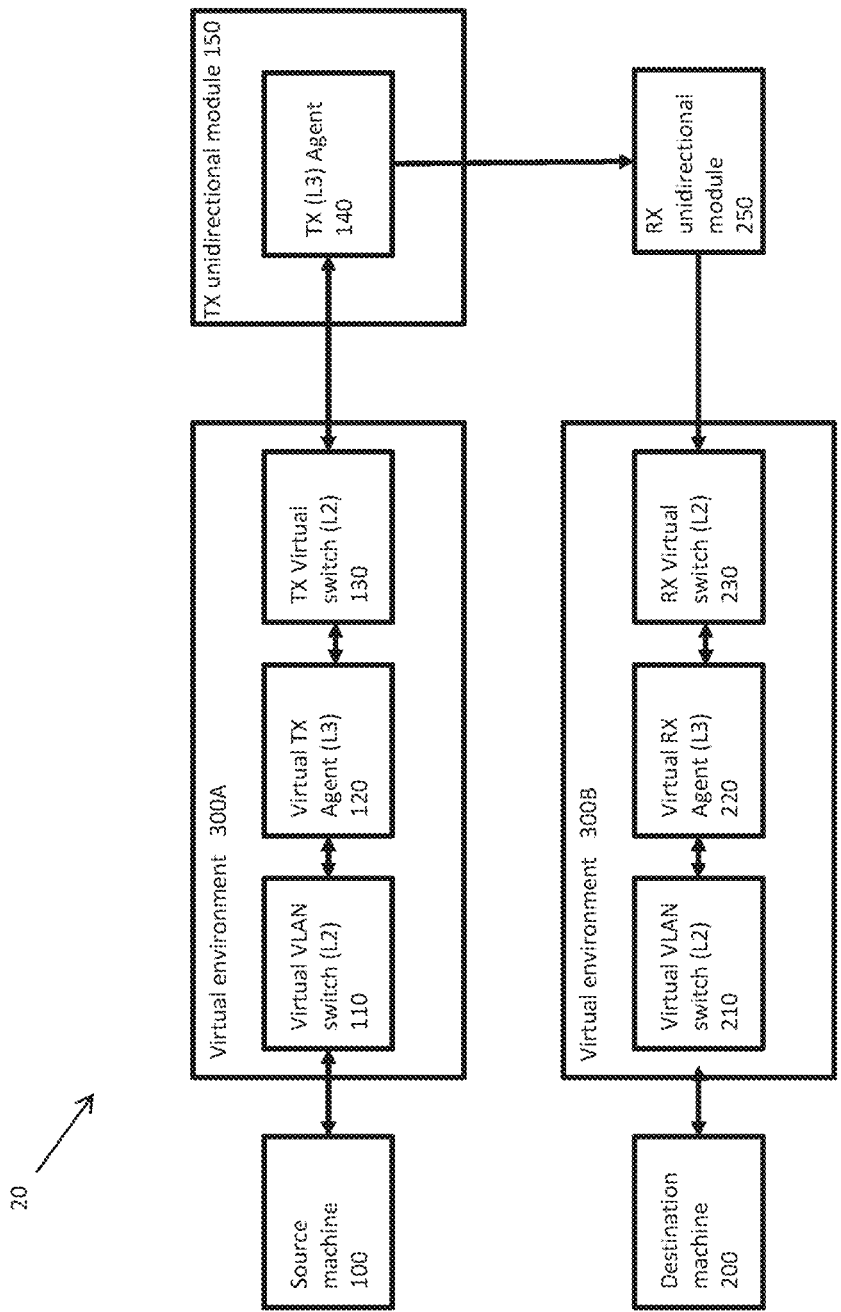

FIG. 1B presents a packet switching system 20 according to another embodiment of the present invention. According to this embodiment, the TX L3 Agent 140 described above with respect to FIG. 1A is incorporated within the unidirectional TX module 150.

According to the OSI network communication layers' model, a destination machine's MAC (physical) address is required in order to convey Layer 2 data frames to that machine. The ARP protocol is normally employed on bi-directional networks for obtaining the said MAC address. Unidirectional networks present a problem for standard network protocols that require feedback, such as the ARP (Address Request Protocol) protocol. Moreover, unidirectional networks present a problem for virtual packet switches when they come to associate specific ports with the MAC (physical) addresses to which they are required to transfer data.

FIG. 2 is a flow diagram 300 depicting the process of acquiring the destination machine's MAC address over unidirectional communication, in the absence of an ARP response, according to one embodiment of the present invention.

The process begins when a physical or virtual source machine 100 initiates communication, and tries to send a packet to another physical or virtual destination machine 200. The source machine 100 broadcasts an ARP (Address Resolution Protocol) request, to obtain the destination machine's MAC (physical) address (step 302).

As the source machine 100 resides on the same subnet, or is directly linked to the virtual source switch 110, The ARP request is received by the virtual source switch 110. The virtual source switch 110 broadcasts the ARP request, propagating it at least to the virtual TX (L3) agent 120 (step 304).

The virtual TX agent 120 broadcasts the ARP request, propagating it to at least the TX virtual switch 130 (step 306).

The TX virtual switch 130 resides on the same subnet, or is physically connected to the TX L3 agent 140. The TX virtual switch 130 broadcasts the ARP request, propagating it to the TX L3 Agent 140 (step 308).

The TX L3 Agent 140 holds an ARP table, associating IP addresses with MAC (physical) addresses. The TX L3 agent 140 does not propagate the ARP request. According to some embodiments, the TX L3 agent 140 responds to the ARP request message with an ARP response message, providing the virtual RX agent's 220 MAC address as the destination machine's MAC address (step 310). According to other embodiments, the TX L3 agent 140 provides the actual destination machine's MAC address.

The ARP response is propagated to the source machine 100 (step 312). During this process:
  The TX virtual switch 130 and virtual source switch 110
    update their MAC tables, and associate the Virtual RX
    Agent's 220 MAC address with the destination
    machine's IP The TX virtual switch 130 and virtual source switch 110 associate the Virtual RX Agent's 220 MAC address with the respective ports upon which they received the ARP response The source machine updates its MAC table, and associates the Virtual RX Agent's 220 MAC address with the destination machine's IP Following the assertion of the destination machine's MAC address or the virtual RX agent's 220 MAC address, the packet switching system 10 may support unidirectional packet switching, from the source machine 100 to the destination machine 200.

FIG. 3 is a flow diagram 400 depicting the propagation of level 3 data, i.e. 'Network' level communications over a unidirectional medium, according to embodiments of the present invention. The physical or virtual source machine 100 transmits a packet to a physical or virtual destination machine 200 (step 402).

The source machine 100 resides on the same subnet or is directly linked to a virtual source switch 110. The virtual source switch 110 propagates the packet to the virtual TX agent 120 (step 404).

The virtual TX agent 120 recognized the packet as addressed to the RX agent 220. According to some embodiments, the virtual TX agent 120 applies at least one of the following actions to the said packet (step 406):

The packet is segmented into a number of smaller packets, each bearing a smaller payload, and labeled by a different packet number.

Adds FEC (Forward Error Correction) redundant data to the packets' payload

Creates transmission redundancy, by multiplying the packets and transmitting each packet more than once.

The virtual TX agent 120 propagates the packets to the TX virtual switch 130 (step 408).

The TX virtual switch 130 resides on the same subnet, or is physically connected to the TX L3 agent physical module 140. At this stage it has already obtained the RX agent 220 MAC address, and associated it with a specific port as described in relation to FIG. 2. The TX virtual switch 130 forwards the packets via that port to the physical TX L3 agent module 140 (step 410).

The TX L3 agent module 140 forwards the packets via the unidirectional communication link (i.e. between the unidirectional TX module 150 and the unidirectional RX module 250) to the RX Virtual switch 230 (step 412).

The RX virtual switch 230 resides on the same subnet as the RX Agent 220, or is directly linked to it. The RX virtual switch 230 forwards the packets to the RX agent 220 (step 414).

The virtual RX agent 220 removes all redundant data appended to it by the virtual TX agent 120. It recognized the packet as addressed to the destination machine 200 and applies at least one of the following actions to the said packet (step 416):

Packet duplications are dropped, leaving only single copies of each packet

Errors are corrected according to the FEC code, and redundant FEC bits are removed Packets are ordered by their packet numbers, and Packets are aggregated, to reconstruct the original packet structures.

The RX agent 220 routes the received packets to the destination machine 200, either directly or via the virtual destination switch 210 (step 418).

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include a program, which may be written in any conventional programming language, and a machine for executing the program such as but not limited to a general purpose computer which may optionally be configured or activated in accordance with the teachings of the present invention. Any of the teachings incorporated herein may wherever suitable operate on signals representative of physical objects or substances. Throughout the specification, terms such as, "processing", "computing", "estimating", "selecting", "calculating", "determining", "generating", "associating", "obtaining" or the like, refer to the action and/or processes of a computer that manipulates and/or transforms data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for directing data packets over a network from a source machine via at least one virtual packet switch, over a single physical unidirectional connection to at least one destination machine, said system comprising:
    a transmission (TX) Layer 3 agent, located on the network between the source machine and the single physical unidirectional connection of a physical TX diode, configured to receive an Address Request Protocol (ARP) request message from the source machine and to respond with an ARP response message containing a Media Access Control (MAC) address of a reception (RX) device as the destination machine's physical MAC address, hence enabling virtual TX-side switches to propagate packets toward the destination machine, wherein the TX Layer 3 agent does not propagate the ARP request to the destination machine, wherein the physical unidirectional connection is located on the network between the TX Layer 3 agent and the RX machine, such that all communication is directed only one way from the TX Layer 3 agent to the RX machine, wherein the source machine updates its MAC table, and associates the received MAC address of the reception (RX) device with the destination machine's IP; wherein the communication is transferred only using the single physical unidirectional connection comprised of the diode.

2. The system of claim 1, further comprising:
    a virtual TX agent, located on the network between the source machine and the TX Layer 3 agent, configured to identify packets that are addressed to the at least one destination machine, to alter them in a manner facilitating data transmission over unidirectional networks, and to route them towards a virtual RX agent, located on the network between the physical unidirectional connection and the at least one destination machine; and
    a virtual RX agent configured to receive said packets from the TX agent and to route them either directly or via additional network components to the destination machine.

3. The system of claim 2, wherein the virtual TX agent is further configured to segment the packets into a number of smaller packets, each bearing a smaller payload and labeled by a different packet number, and wherein the virtual RX agent is further configured to organize the incoming segment packets by their packet numbers, and to aggregate them to reconstruct the original packet structures.

4. The system of claim 2, wherein the virtual TX agent is further configured to add Forward Error Correction (FEC) redundant data to the packets' payloads, and wherein the virtual RX agent is further configured to correct errors according to the FEC code and remove said redundant FEC bits.

5. The system of claim 2, wherein the virtual TX agent is further configured to create transmission redundancy, by multiplying the packets and transmitting each packet more than once, and wherein the virtual RX agent is further configured to drop packet duplications, and leave only single copies of each packet.

6. The system of claim 1, wherein the TX Layer 3 agent is configured to respond to the ARP request message with the MAC address of the MAC address of the at least one destination machine.

7. A method for directing data packets over a network from a source machine via at least one virtual packet switch, over a single physical unidirectional connection to at least one destination machine, said method comprising:
    configuring a transmission (TX) Layer 3 agent, located between the source machine and the single physical unidirectional connection of a physical TX diode, to receive an Address Request Protocol (ARP) request message from the source machine and to respond with an ARP response message containing a Media Access Control (MAC) address of a reception (RX) machine as the destination machine's physical MAC address, hence enabling virtual TX-side switches to propagate packets toward the destination machine, wherein the TX Layer 3 agent does not propagate the ARP request to the destination machine;
    wherein the single physical unidirectional connection is located on the network between the TX Layer 3 agent and the RX machine, such that all communication is directed only one way from the TX Layer 3 agent to the RX machine, wherein the source machine updates its MAC table, and associates the received MAC address of the reception (RX) machine with the destination machine's IP;

wherein the communication is transferred only using the single physical unidirectional connection comprised of the diode.

\* \* \* \* \*